June 19, 1962 G. N. WEST 3,040,307
TAPE READING APPARATUS
Filed June 30, 1959
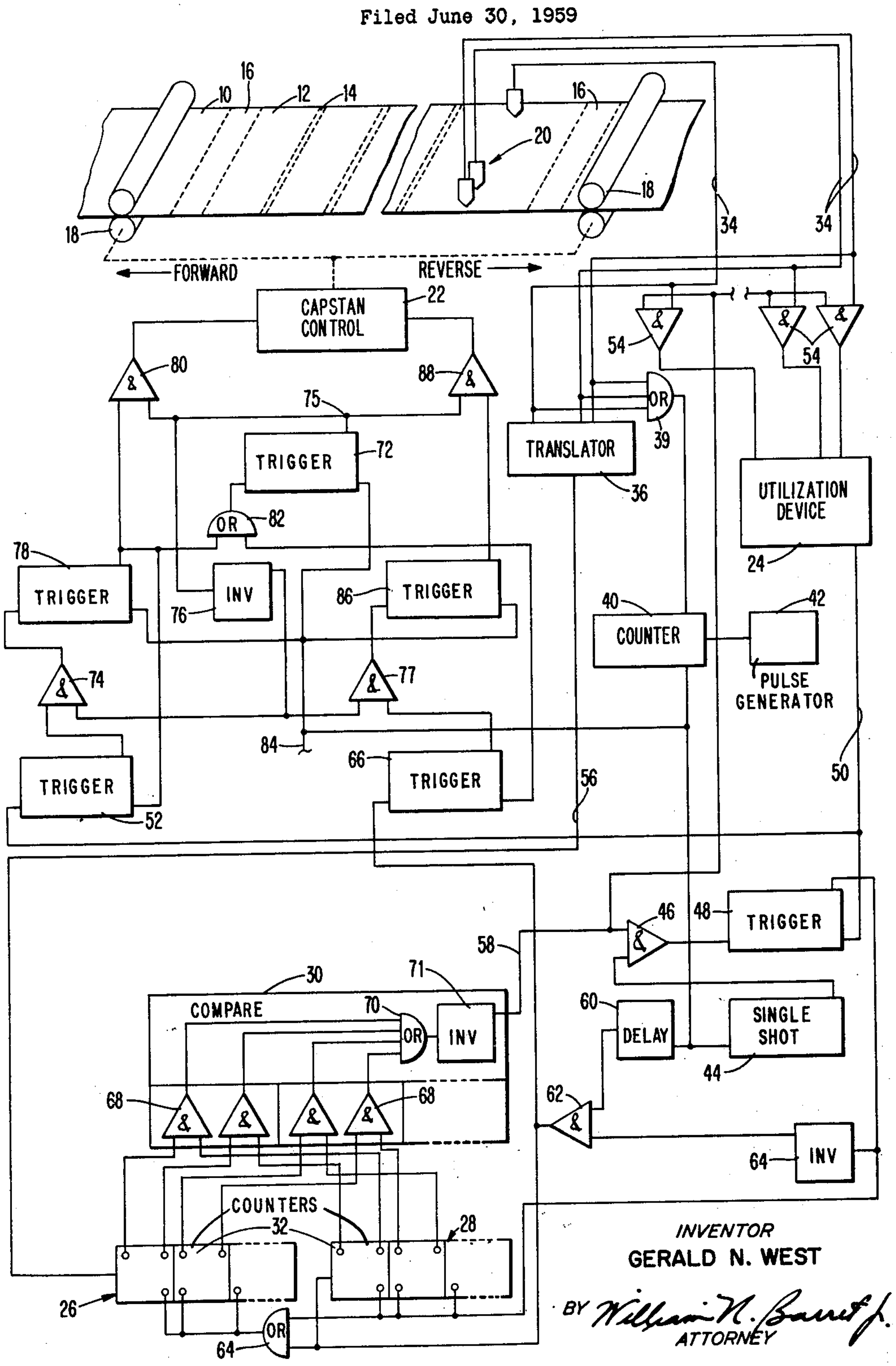
INVENTOR
GERALD N. WEST
BY William N. Barret Jr.
ATTORNEY United States Patent Office 3,040,307
Patented June 19, 1962

3,040,307
TAPE READING APPARATUS

Gerald N. West, Endwell, N.Y., assignor to International Business Machines Corporation, New York, N.Y., a corporation of New York Filed June 30, 1959, Ser. No. 824,030
7 Claims. (Cl. 340—174.1)

The present invention relates to an appratus for reading data contained on a medium having a non-cyclic access, and in particular to an apparatus for reading successive blocks of data contained on a magnetic tape by oscillating the successive blocks of data beneath the reading heads.

Magnetic tapes are capable of storing large quantities of data in a very small space, so that with proper reading equipment, information flow may be very high. In the data processing apparatus, magnetic tapes are utilized in many instances to provide a large storage which may be rapidly read in to the main processing console for utilization. For other uses, however, while the rate of information input which can be obtained from a tape is desirable, the amount of information needed at one time is small.

If the data from a tape is to be used in a utilization device which needs only a given amount of information, but needs it in a very short period of time, the apparent solution would be to stop the tape reading apparatus after each given amount of data had been read and wait for a signal to read the next given amount of information. For a given problem where the given amount of data is large enough to occupy a substantial area of tape, this may indeed prove to be an acceptable solution.

However, for relatively small amounts of information, this approach is not economically feasible, where the tape drive which is to be used may require three-fourths of an inch to stop from full speed. This length of tape, when compared with the amount of data which can be stored in one-fourth of an inch of tape, e.g. one hundred (100) characters, points up the situation where only one hundred (100) characters, for example, may be required at one time. This would mean that seventy-five percent of the tape would be used for spaces for stopping the tape drive, while only twenty-five percent was to be used for information. This, of course, is an absurd waste of magnetic tape, both economically and in time for changing reels of tape, etc.

The present invention solves this problem by providing an apparatus which oscillates the tape between two interspace gaps and reads a given successive number of characters on each forward movement of a tape to provide a controlled input to a utilization device at a high rate of information input without excessive amounts of tape being used as spaces.

While the numbers used in pointing up the invention are realistic for many apparatus, it should be expressly understood that the invention is not particularly limited by any relative proportions of characters as used in the example.

It is therefore an object of this invention to provide an improved apparatus for reading data from a non-cyclic storage medium.

It is a further object of this invention to provide an apparatus for selectively reading incremental blocks of data from a non-cyclic storage at high speed without providing interspaces between the incremental blocks.

Another object of this invention is to provide an apparatus for successively reading selected blocks of data from a non-cyclic storage medium at selected times without stopping the storage medium at a point immediately after a block of data has been read.

Still another object of this invention is to provide a reading apparatus for a magnetic tape in which characters recorded thereon in groups are successively read during successive oscillations of the tape between two points.

The foregoing and other objects, features and advantages of the invention will be apparent from the following more particular description of a preferred embodiment of the invention, as illustrated in the accompanying drawing.

In the drawing:

The FIGURE is a schematic illustration of the invention.

A magnetic tape 10 capable of being magnetized to form areas of recorded information is shown with capstans 18 for moving the tape 10 beneath a series of recording or reading heads 20. The capstan control 22 provides the directional motive power for the capstans 18 and may be energized to provide motion to the capstans for either forward to reverse movement of the tape 10.

The data on the tape consists of subgroups of characters 12 divided by record marks 14. The record mark is a character formed in the same manner as the data but having a code form which is recognizable as a record mark. Th subgroups of characters are contained between areas 16 called interspace gaps which contain no data recorded therein. By having these areas of a predetermined width, they will be recognized as such.

A utilization device 24 of no particular form is shown for accepting the data characters read by heads 20. This device 24 has need for only a single subgroup at one time, but needs the information at a high rate. As mentioned previously, the tape 10 will be oscillated beneath the heads 20 and on each movement to the left, for example, a selected subgroup will be read into the device 24. The oscillations will be between the interspace gaps.

The other main functional elements are the record mark counter 26, the subgroup scan counter 28 and a compare circuit 30. The record mark counter 26 is used to keep track of the particular subgroup which is then being read, while the record scan counter 28 will determine the subgroup to be gated into the device 24. The compare circuit compares the counts in each for equality in order to gate the information from heads 20 at the proper subgroup.

The circuit elements are shown in logic blocks in view of the well-know circuit configuration of each element. In this respect the triangle indicates AND circuits and responds to all inputs having raised voltage levels for producing a raised output. The OR circuits indicated by half-moons respond to any input having a raised voltage to produce a raised voltage output. Inverters shown as boxes and labeled "I" invert the input entering the side of the box. Trigger circuits or flip-flop ar indicated by a "T" and operate by a positive voltage level applied at the lower left to produce a raised voltage at the upper right. A reset is shown at the lower right to reverse the condition.

The binary counters 26 and 28 are illustrated in somewhat more detail because of the manner of connection of the stages 32 in the compare circuit 30. A stage 32 contains an output from each element of the flip-flop or trigger 32 so that the presence of a "1" or an "0" can be determined. The resets for each stage are shown at the lower right and reset the counter to a count of "1." This convention would be with the left side high and the right side low to indicate a binary "1" with the reverse condition for binary "0."

As the tape 10 moves between the interspace gaps, the heads 20 sense each character which passes beneath to generate voltage signals on the output lines 34. Connected to the output lines 34 is a translator 36 to detect the character used as a record mark and provide an output signal to the counter 26. For each record mark and consequently for each record, the counter 26 will be advanced by one count and this fact will be indicated on the outputs of the individual stages 32 in a conventional manner.

A counter 40 is pulsed continuously from a pulse generator 42 and is reset by the occurrence of each character through OR circuit 39. By this method an interspace area having no character recorded therein will not reset the counter for a predetermined time and allow the count in the counter to reach a predetermined number. By making a connection to this stage, an indication will be obtained that an interspace gap 16 has been detected.

When the counter 40 generates a pulse, it is applied to a single shot trigger 44 to provide an output as a raised voltage level for a predetermined period of time after which the output will drop. An AND circuit 46 receives the output from the single shot 44 and the compare circuit 30 to produce a raised input voltage to a trigger 48 to set the same. This logic array provides for recognition of both an interspace gap and an equality in the records read and the record to be read to indicate that the tape is to read the records in the next group of records and to reset the record scan counter 28 to a count of "1" and the record mark counter 26 to a count of "1." In the absence of a signal to read forward or backward, the tape will stop in the intergap area.

When the utilization device requests more data, a signal is presented on line 50 which resets the last record trigger 48 and provides a signal to a trigger 52 in order to initiate movement of the tape in a forward direction in order to read the record which has been set in the scan counter 28. As it will be remembered, the number "1" has been set into both counters 28 and 32 by completion of the reading operation of the data contained between prior interspace gaps. The tape as it moves forward will present the first record to the reading heads 20. At this time the compare circuit 30 will provide a raised output to the AND circuits connected to the heads 20 so that the first record will be read into the utilization device 24.

When the tape has moved to the record mark 14, which as mentioned previously is a single character recognizable as a record mark, the output 56 will rise and advance the record mark counter 26 to the next successive digit which is "2." This provides an inequality between record mark counter 26 and scan counter 28 so that the compare circuit will drop the output 58 to a low voltage level. The gates 54 will then not transmit any further information to the utilization device 24 for the remainder of the movement of the tape to the next succeeding interspace area since there will be a continuous mismatch between the counters 26 and 28. Counter 28 will indicate "1" while counter 26 will be advanced successively to indicate the total number of records contained between interspace areas.

When the tape 10 reaches the next successive interspace area, the counter 40 will provide a pulse indicative of this fact in a similar manner to that mentioned previously to set single shot 44, and to provide a pulse through a delay circuit 60, which could be a single shot trigger, to the AND circuit 62. Since the AND circuit 46 does not receive a raised input from compare circuit 30, the trigger circuit 48 is not set so that the input of an inverter 64 will have a raised voltage output. This raised voltage will reset the counter 26 through an OR circuit 64 while providing a pulse to advance the counter 28 by one. A trigger 66 is also set to move the tape backward to the interspace area where the movement of tape was initiated for this group of data.

While all the various interlocks which are necessary have not been shown, it is to be understood that the reading apparatus would be disabled on the reverse movement of the tape and an interspace area detecting means provided for determining the presence of an interspace area when the tape is moved in the backward direction.

The oscillating of the tape is continued until all the character subgroups in a group have been read into the data utilization device. This would be when both counters 26 and 28 are equal and an interspace gap 16 occurs. In this respect, it should be noted that the counter must have the required number of stages to provide a capacity to count to a number as large as there will be subgroups just as the scan counter 26 must have the same capacity.

The counters 26 and 28 each contain a number of stages 32 having outputs as shown to indicate by a raised voltage level, which side of the trigger is ON. The compare circuit 30 consists of a number of AND circuits 68 which are connected to opposite sides of a given trigger 32 in each counter. Two AND circuits 68 are provided for each stage associated with a particular denominational order. When the same demoninational stage in each counter contains the same indication, one line to each AND circuit will be up while one line will be down and no output will be provided to OR circuit 70. With no input to an inverter 71, the output 58 will be up to indicate a matched indication in counters 26 and 28. If any stages 32 are mismatched, the particular AND circuit 68 wlil provide an output and the output 58 will be down to indicate a mismatched condition.

While the particular circuit for controlling the capstan control 22 is not specific to the present invention, a particular method of obtaining control is presented in which a trigger 52 initiates a forward movement of tape 10 while trigger 66 initiates a reverse movement on tape 10.

When trigger 52 is turned ON, one input to AND circuit 74 has a raised voltage level. If the tape is stationary, at an interspace gap, a "go" trigger 72 will be OFF, and the output 74 will be down. The inverter 76 utilizes this down signal to provide a raised voltage level on AND circuits 74 and 77. With raised signals on AND 74, the trigger 78 will be set to provide a raised output to condition AND circuit 80, to reset trigger 52, and to set trigger 72 by way of OR circuit 82. When the output 75 of trigger 72 goes up, the AND circuit 80 will energize the control 22 to drive the tape 10 in a forward direction.

When the tape 10 reaches an interspace area of the tape a signal will be generated as explained previously, to reset trigger 78 or trigger 86 to an OFF condition and also trigger 72. This lowers the input to AND circuit 80 or AND circuit 88 to de-energize control 22 to stop the tape 10. The signal at 84 is the same as that generated by counter 40 when the tape is moved in the forward direction, except that this is a signal from the interspace gap when the tape is moving in a backward direction, which has not been shown.

When a signal is generated at the output of AND 62, the trigger 66 is set and the tape is moved in a reverse direction in the same manner as described with reference to the forward movement.

While the present invention has been illustrated using a counter 28 which advances sequentially by one for each oscillation of the tape 10, it should be understood that the counting scheme could be modified to select different subgroups according to a prewired scheme or by use of a selector switch manually operable or programmable from an external source or one contained on the tape itself. The only limitation would be the necessity of having the last subgroup between successive interspace areas be the last one sensed or to modify the counting arrangement of the counter 26 in some manner.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an apparatus for reading data contained on a storage medium wherein said data is divided into groups with interspace areas for points of demarcation between areas and wherein said groups of data are further divided into subgroups, selectively operatable reading means positioned adjacent said storage medium, means for moving each successive group of data beneath said sensing means a number of times equal to the number of subgroups in each group, means for counting the subgroups in each group of data each time said group is moved beneath said head for reading and providing an indication thereof, a subgroup selection counter for providing an indication of the next successive subgroup to read, means responsive to the coincidence of indications for operating said reading means, and means included in said moving means responsive to the reading of all said subgroups of a given group for advancing said storage medium to the next group of data.

2. The apparatus of claim 1 further including means for generating a signal indicative of an interspace area, and means responsive to an interspace signal for changing said subgroup selection counter to provide an indication of the subgroup to be read on the next oscillation.

3. The apparatus of claim 2 wherein said means responsive to the coincidence of indications for operating said reading means includes a compare circuit to provide a signal when said subgroup counter and said selection counter are equal and said means for advancing said storage medium to the next group of data is responsive to an interspace signal and a compare signal for resetting said selection counter and said subgroup counter.

4. In an apparatus for reading data contained on a storage medium in successive oscillations, wherein said data is divided into groups of characters divided by interspace areas and subgroups of characters divided by record marks, sensing means for detecting the data contained on said medium, means for moving each successive group of data beneath said sensing means a number of times equal to the subgroups in each group gating means for selectively transmitting data from said sensing means, a subgroup counter for determining the presence of a subgroup beneath said sensing means, a selection counter for determining the subgroup which is to be sensed on each oscillation, a compare circuit responsive to an identical indication in each counter to provide a signal to gate the subgroup of characters identified in said selection counter and means included in said moving means responsive to the reading of all said subgroups of a driven group for advancing said storage medium to the next group of data.

5. The apparatus of claim 4 further including means for generating a signal indicative of an interspace area, and means responsive to an interspace signal and no signal from said compare circuit to advance said subgroup selection counter and move the tape to the preceding interspace area.

6. The apparatus of claim 5 further including means responsive to an interspace signal and a compare signal for resetting said selection counter and said subgroup counter.

7. The apparatus of claim 6 including a utilization device for receiving data read from said record medium, signal means from said utilization to request the next successive subgroup of information and means responsive to said signal for moving said tape to the next successive interspace area.

References Cited in the file of this patent

UNITED STATES PATENTS

| | | |
|---|---|---|
| 2,540,654 | Cohen et al. | Feb. 6, 1951 |
| 2,692,728 | Strickler | Oct. 26, 1954 |
| 2,900,132 | Burns et al. | Aug. 18, 1959 |
| 2,901,730 | Goddard | Aug. 25, 1959 |
| 2,904,777 | Cox et al. | Sept. 15, 1959 |